United States Patent [19]
Breidenbach

[11] Patent Number: 5,879,056
[45] Date of Patent: Mar. 9, 1999

[54] KICKBACK PROTECTION DEVICE AND METHOD OF USE

[75] Inventor: Thomas S. Breidenbach, Maple Grove, Minn.

[73] Assignee: Caterpillar Inc., Peoria, Ill.

[21] Appl. No.: 845,991

[22] Filed: Apr. 25, 1997

[51] Int. Cl.$^6$ .................................................. E01C 23/12
[52] U.S. Cl. ........................................ 299/1.5; 404/84.05
[58] Field of Search ................................. 299/1.5, 39.1; 404/84.05, 84.1, 90, 91

[56] References Cited

U.S. PATENT DOCUMENTS

| | | | |
|---|---|---|---|
| 4,343,513 | 8/1982 | Godbersen | 299/1.5 |
| 4,929,121 | 5/1990 | Lent et al. | 299/1.5 X |
| 5,318,378 | 6/1994 | Lent | 404/75 |

*Primary Examiner*—David J. Bagnell
*Attorney, Agent, or Firm*—Merchant & Gold

[57] ABSTRACT

The present invention relates to a device for detecting when a cold planer experiences a kickback condition. The device includes a wheel adapted to be connected to the cold planer such that the wheel is caused to rotate in a first direction when the cold planer travels forward, and a second direction when the cold planer travels backward. The device also includes a sensing assembly having an electronic sensor. The sensing assembly is arranged and configured for detecting when the wheel travels in the second direction, and for providing a signal to an on-board computer of the cold planer indicating that a kickback has been detected.

18 Claims, 11 Drawing Sheets

Fig_3_

Fig-4

Fig_5_

Fig. 6

Fig_9C_

Fig. 10.

KICKBACK PROTECTION DEVICE AND METHOD OF USE

TECHNICAL INVENTION

The present invention relates generally to safety devices for use with heavy industrial equipment. More specifically, the present invention relates to devices and methods for detecting when a cold planer is subject to a kickback, and for disabling the cold planer when the kickback is detected.

BACKGROUND ART

A class of machines known as cold planers (e.g., Caterpillar PM565) are used to remove asphalt from road surfaces. A typical cold planer includes a plurality of drive tracks, a rotatable cutting drum, and a conveyor for transporting excavated asphalt away from the cutting drum. The cutting drum is equipped with a plurality of carbide teeth configured for milling a road surface when the drum is rotated. In operation, the cutting drum is typically rotated in a direction opposite from the direction of travel of the cold planer. Consequently, if the cold planer encounters a condition where the friction between the cutting drum and the road exceeds the friction between the tracks and the road, the machine may lurch backward. Such a condition is known as kickback.

To prevent kickbacks, a variety of kickback protection devices have been developed which are capable of sensing the backward movement of a cold planer and disabling the cutting drum of the cold planer. Current kickback protection devices are sensitive to small backward movements of the machine. This is a disadvantage when cutting concrete, cracked roads, or other surfaces which cause the machine to jerk slightly forward and backward. The backward jerking caused by rough road surfaces is not the same as a kickback and does not result in the cold planer being propelled backward any significant distance. However, this jerking often is enough to trip current kickback protection devices, thereby resulting in frequent false alarms and machine shut-downs. Frequent erroneous shut-downs are a nuisance to cold planer operators. Consequently, such operators often disable conventional kickback protection devices.

There currently is a need for a kickback protection device that allows for slight backwards movement of a cold planer without tripping a kickback alarm. There is also a need for a kickback protection device designed to allow an operator to adjust the sensitivity of the device to suit specific operating conditions. Furthermore, what is needed is a kickback device adapted to maintain contact with a road surface through discontinuities in the road and through changes in the elevation of the cold planer on which the device is mounted. Moreover, what is needed is a kickback protection device that also serves the function of sensing a relative elevation difference between a ground/road surface and a cutting plane of a cold planer. The present invention addresses these needs as well as other needs.

DISCLOSURE OF THE INVENTION

The present invention relates generally to a device for detecting when a cold planer experiences a kickback condition. The device includes a wheel that is connected to the cold planer via a mounting assembly. The mounting assembly is configured to allow the wheel to rotate in a first direction when the cold planer travels forward, and a second direction when the cold planer travels backward. The device also includes a sensing assembly having an electronic sensor. The sensing assembly is arranged and configured for detecting when the wheel travels in the second direction, and for providing a signal to a computer of the cold planer indicating that a kickback has been detected. Once a kickback has been detected, the computer shuts down or disables the cold planer. In certain embodiments, the mounting assembly can be configured to allow the wheel to caster such that the wheel maintains road contact while the cold planer is turning or crabbing across road discontinuities. The mounting assembly can also be configured to allow the wheel to move upward and downward relative to the cold planer in response to discontinuities in the road and changes in the elevation of the cold planer.

Another aspect of the present invention relates to a kickback protection device that is equipped with a measuring apparatus for measuring an elevation difference between a cutting plane of the cold planer and a ground surface. By combining the kickback protection and elevation sensing functions in a single device, a cold planer operator does not need to set up two separate devices.

A further aspect of the present invention relates to a method for disabling a cold planer that experiences a kickback condition. The method includes the step of providing a wheel mounted to the cold planer. The wheel is arranged to rotate in a first direction when the cold planer moves forward, and a second direction when the cold planer moves backward. The method also includes the steps of monitoring the rotation of the wheel, and sensing when the wheel rotates a predetermined distance in the second direction. The method further includes a step of disabling the milling drum of the cold planer when it is detected that the wheel has rotated the predetermined distance in the second direction. The sensitivity of the detection method can be varied by varying the predetermined distance that the wheel rotates in the second direction before the backward rotation triggers a shut down of the cold planer.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows.

BEST MODE FOR CARRYING OUT THE INVENTION

Reference will now be made in detail to exemplary embodiments of the present invention which are illustrated in the accompanying drawings. Wherever possible, the same reference numbers will be used throughout the drawings to refer to the same or like parts.

Figure 1:
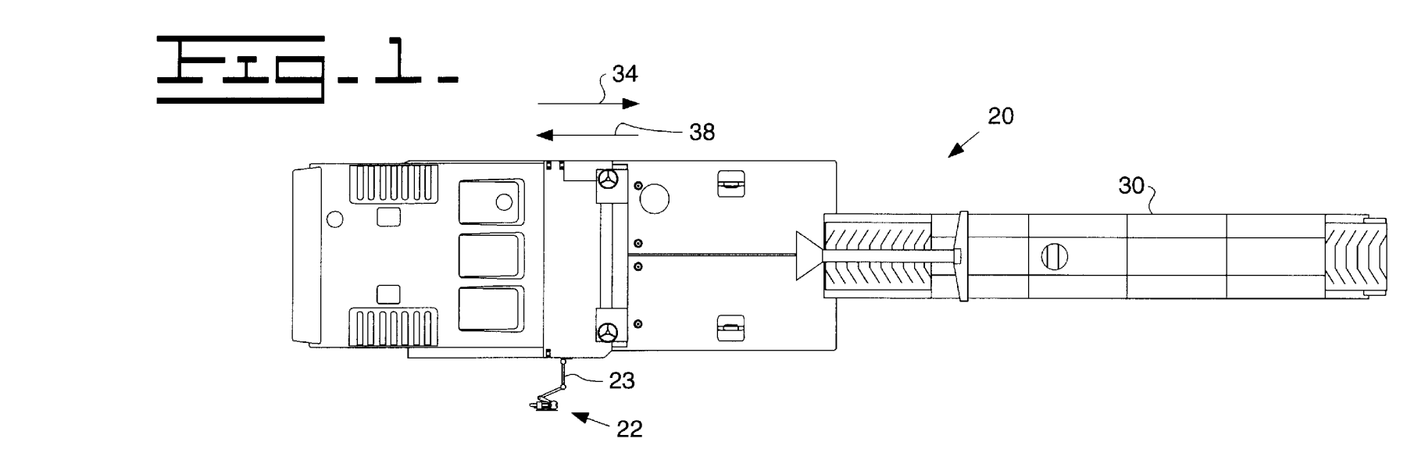
FIG. 1 is a top view of a cold planer including a kickback protection device constructed in accordance with the principles of the present inventions.
Figure 2:
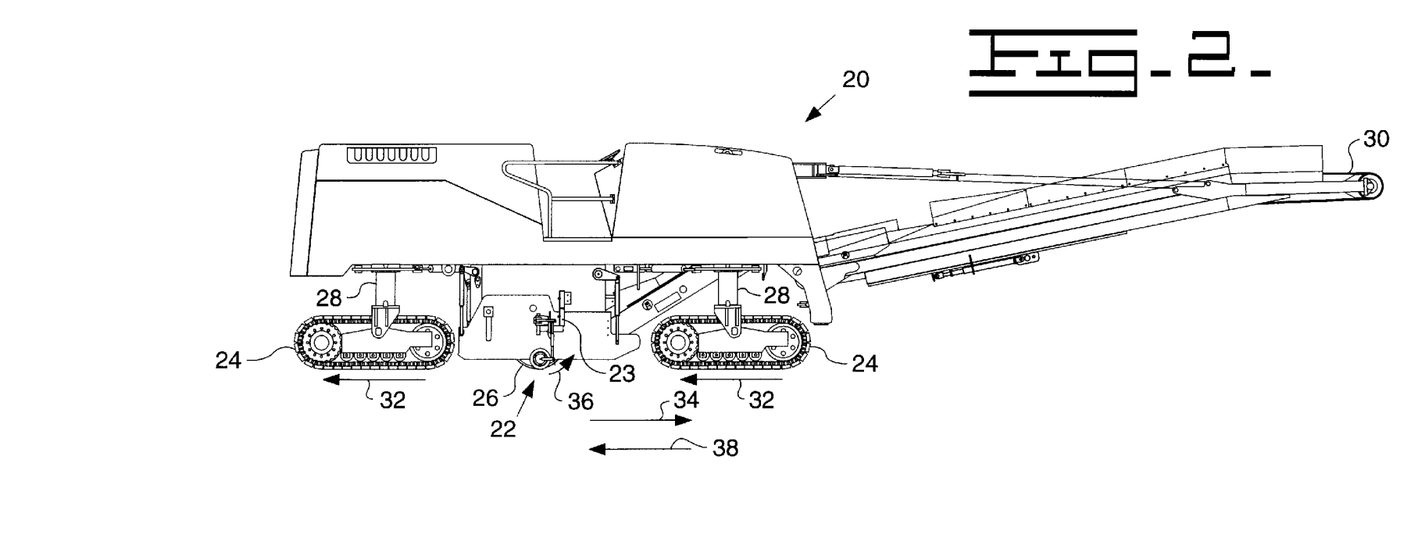
FIG. 2 is a side view of the cold planer of FIG. 1.

FIGS. 1 and 2 illustrate a cold planer 20 equipped with a kickback protection device 22 constructed in accordance with principles of the present invention. Generally, the cold planer 20 includes a plurality of drive tracks 24 configured for propelling the cold planer 20 along a road surface. The cold planer 20 also includes a cutting drum 26 for milling the road surface. A cutting plane of the cold planer 20 is tangent to the bottom of the cutting drum 26 and parallel to the direction of travel of the cold planer 20. The tracks 24 of the cold planer 20 are connected to the main body of the cold planer 20 by hydraulic legs 28. The hydraulic legs 28 are configured to raise and lower the cutting drum 26 relative to the tracks 24 so as to control the elevation of the cutting drum cutting plane. The cold planer 20 is further equipped with a conveyor 30 configured to transport excavated asphalt from the cutting drum 26 to a discharge location such as the bed of a dump truck.

The kickback protection device 22 is connected to the cold planer 20 by an articulated arm 23. Although the kickback protection device 22 is shown only on the right side of the cold planer 20, it is preferred for the kickback protection device to be located on both sides of the cold planer 20.

In use, the hydraulic legs 28 are adjusted such that the cutting plane of the cutting drum 26 is set at a desired elevation. Once the cutting plan elevation has been set, the tracks 24 are driven in a first direction 32 such that the cold planer 20 is propelled in a forward direction 34. Concurrently, the cutting drum 26 is rotated in a second direction 36 that is opposite from the direction of rotation of the tracks 24. Consequently, the cutting drum 26 tends to push the cold planer 20 in a backward direction 38. Under normal operating conditions, the friction between the tracks 24 and the road exceeds the friction between the cutting drum 26 and the road such that the cold planer 20 moves in the forward direction 34. However, at times, the friction between the cutting drum 26 and the road may exceed the friction between the track 24 and the road such that the cold planer 20 is propelled by the cutting drum 26 in the backward direction 38. When such a kickback occurs, the kickback protection device 22 detects the backward movement of the cold planer 20 and disables or shuts down the cutting drum 26 before the cold planer 20 is propelled backward a sufficient distance to present a significant danger.

Figure 3:
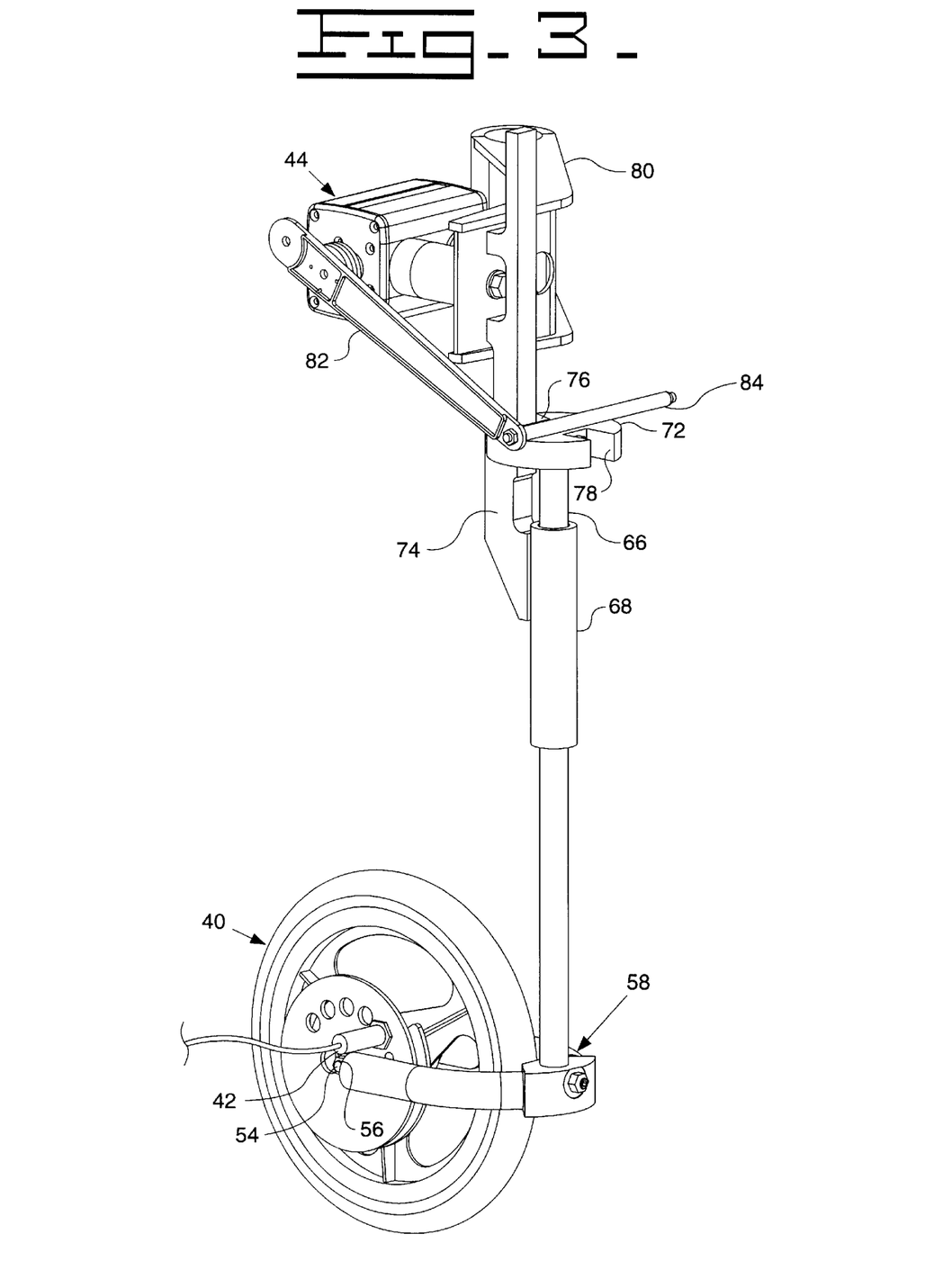
FIG. 3 is a perspective view of the kickback protection device employed by the cold planer of FIG. 1.
Figure 4:
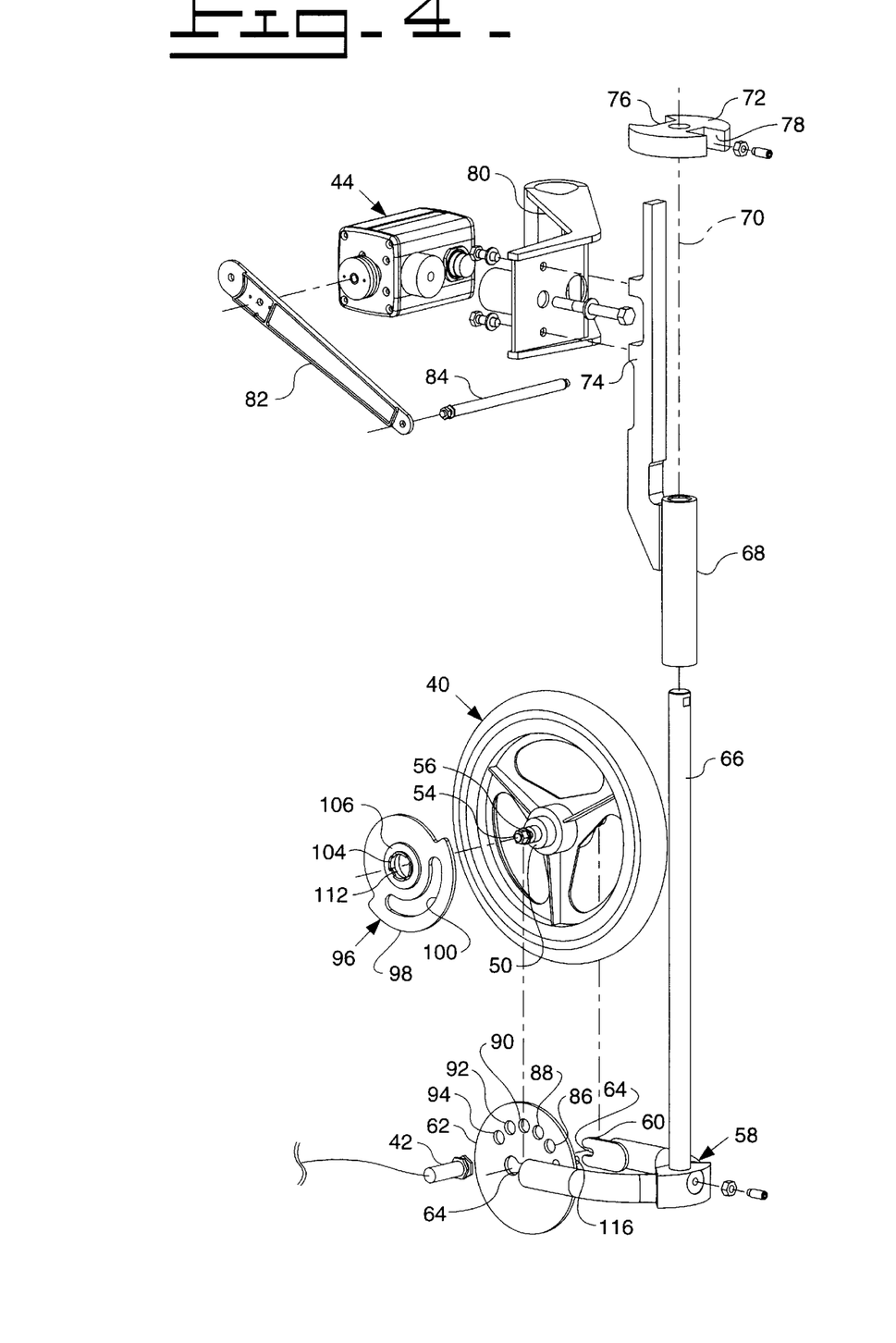
FIG. 4 is an exploded view of the kickback protection device of FIG. 3.

FIGS. 3 and 4 provide further illustrations of the kickback protection device 22. Generally, the kickback protection device 22 includes a wheel 40 connected to the articulated arm 23 of the cold planer 20 by a mounting assembly. When the kickback protection device 22 is mounted on the cold planer 20, the wheel 40 preferably contacts the ground and is adapted to rotate in a first direction when the cold planer 20 travels forward and a second direction when the cold planer 20 travels backward. The kickback protection device 22 also includes a sensing assembly having an electronic sensor 42. The sensing assembly is arranged and configured for detecting when the wheel 40 travels in the second direction, and for providing a signal to an on-board computer of the cold planer 20 indicating that a kickback has been detected. The kickback protection device 22 is further equipped with an elevation measuring device 44 for measuring a relative elevation difference between the ground surface and the cutting plane of the cold planer 20. Each of the components of the kickback protection device 22 will be described in greater detail in the following paragraphs.

Figure 5:
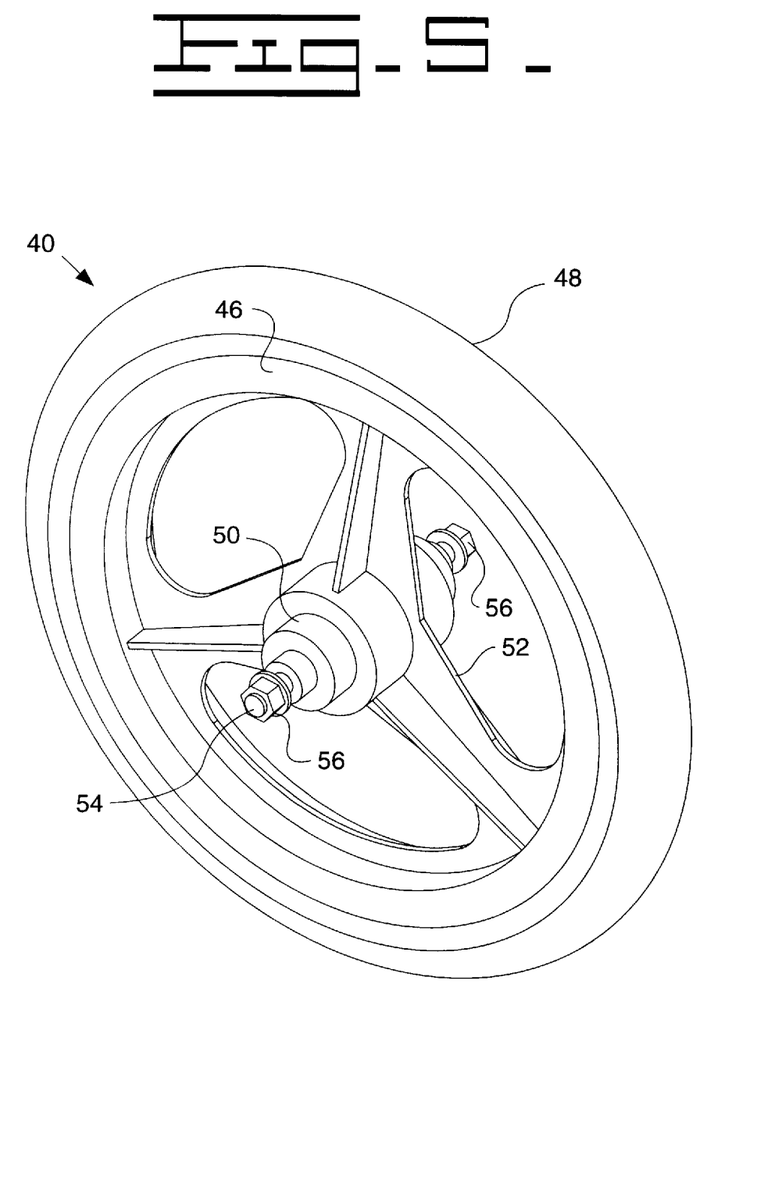
FIG. 5 is a perspective view of a wheel utilized by the kickback protection device of FIG. 3.

FIG. 5 is an enlarged perspective view of the wheel 40. As shown in the figures, the wheel 40 is a bicycle type wheel having a 14" diameter. Of course, any other type of wheel having any dimensions can be used in accordance with the principles of the present invention.

The wheel 40 includes a rim 46 on which a tire 48, constructed of a material such as rubber or solid polyurethane, is mounted. The wheel 40 also includes a central hub 50 that is fixedly connected to the rim 46 by a spoke assembly 52. A threaded axle 54 extends through the center of the hub 50. A conventional bearing (not shown) is positioned between the axle 54 and the hub 50 such that the wheel 40 is able to freely rotate relative to the axle 54. As will be described later, the axle 54 is fixedly connected to the mounting assembly of the cold planer 20 via nuts 56 that are threaded on opposite ends of the axle 54.

Figure 6:
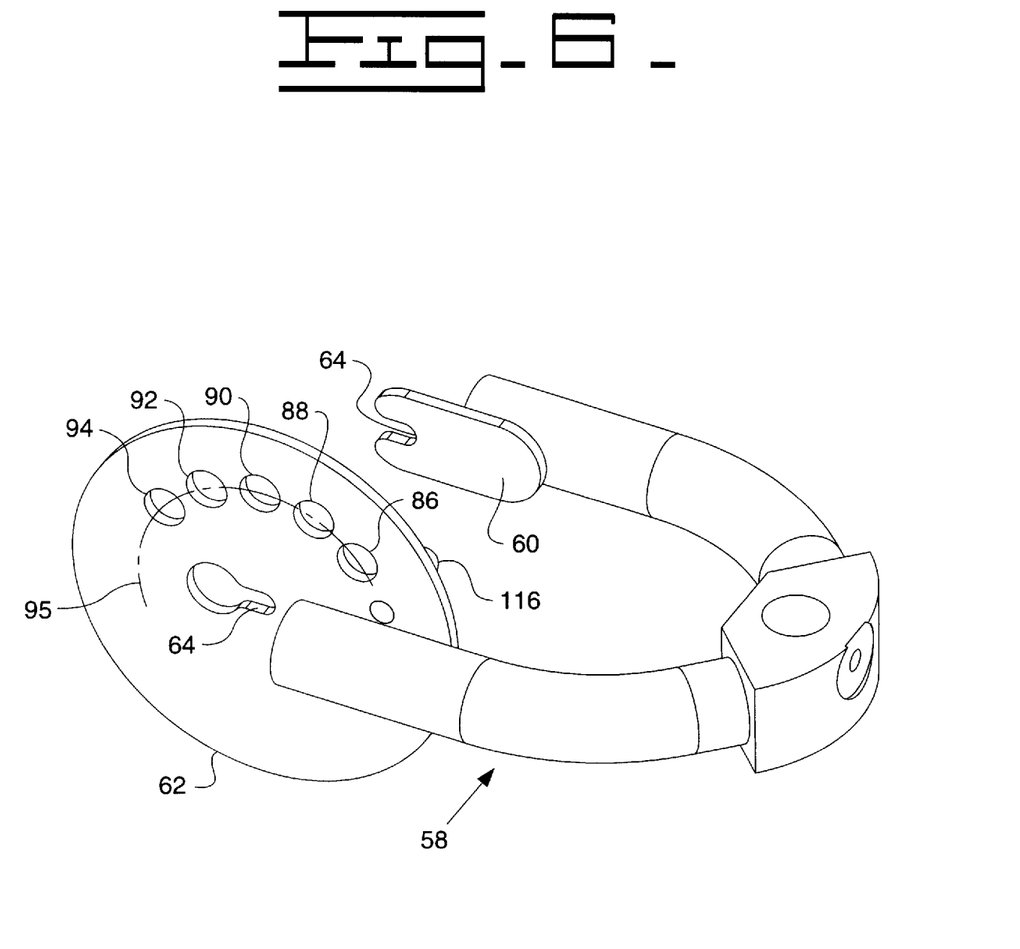
FIG. 6 is a perspective view of a mounting fork utilized by the kickback protection device of FIG. 3.

Referring to FIGS. 3, 4 and 6, the mounting assembly of the kickback protection device 22 includes a fork structure 58 adapted for receiving the wheel 40. The fork structure 58 includes opposing and spaced apart first and second plates 60 and 62 that define slots 64 that are arranged and configured for receiving the axle 54 of the wheel 40. The wheel 40 is connected to the mounting assembly of the kickback protection device 22 by inserting the wheel 40 within the fork structure 58 such that the ends of the axle 54 fit within the slots 64. Once the axle 54 is inserted within the slots 64, the axle nuts 56 are tightened against the first and second plates 60 and 62 such that the axle 54 is fixedly connected to the fork structure 58.

The mounting assembly of the kickback protection device 22 also includes a substantially vertical member 66 fixedly connected to the fork structure 58 by conventional techniques such as a bolt or a set screw. The substantially vertical member 66 projects upward from the fork structure 58 and is received within a tubular linear bearing structure 68. The linear bearing structure 68 allows the vertical member 66 to pivot about its longitudinal axis 70. The linear bearing structure 68 also allows the vertical member 66 to slide upward and downward along its longitudinal axis 70. Upward movement of the vertical member 66 is limited by the fork structure 58. Downward movement of the vertical member 66 is limited by a top member 72, which is secured to the top end of the vertical member 66 by conventional techniques such as a bolt or a set screw. The top member 72 is positioned above the linear bearing structure 68 and engages the top of the linear bearing structure 68 to prevent the vertical member 66 from slipping completely through the liner bearing structure 68.

The pivotal movement of the vertical member 66 with respect to the linear bearing structure 68 allows the wheel 40 to caster in order to maintain road contact while the cold planer 20 is turning or crabbing across road discontinuities. The range of pivotal motion is limited by a limiter arm 74 that is fixedly connected to the linear bearing structure 68. The limiter arm 74 projects upward from the linear bearing structure 68 and extends through a first slot 76 defined by the top member 72. The first slot 76 has a width larger than the width of the limiter arm 74 such that the top member 72 and the attached vertical member 66 have a limited range of pivotal movement with respect to the bearing structure 68. It will be appreciated that the top member 72 is also equipped with a second slot 78 having a width that is approximately equal to the width of the limiter arm 74. The pivotal movement of the vertical member 66 can be substantially eliminated by reorienting the top member 72 such that the limiter arm 74 of the liner bearing structure 68 extends through the second slot 78 of the top member 72.

When the kickback protection device 22 is not in use, the vertical member 66 can be moved upward such that the top member 72 moves above the top of the limiter arm 74. Once the top member 72 is located above the limiter arm 74, the vertical member 66 is rotated approximately 90 degrees to a position where the bottom of the top member 72 rests on the top of the limiter arm 74. Preferably, the bottom of the top member 72 defines a pocket for receiving the top portion of the limiter arm 74. In this manner, when the kickback detection device 22 is not in use, the wheel 40 can be retained in a position above the ground surface.

The mounting assembly of the kickback protection device 22 further includes a mounting bracket 80 configured to be connected to the articulating arm 23 of the cold planer 20. The mounting bracket 80 is shown having a generally L-shaped configuration. Preferably, the mounting bracket 80 is fixedly connected to the limiter arm 74 of the linear bearing structure 78 by conventional techniques such as bolts.

Referring back to FIGS. 3 and 4, the elevation measuring device 44 is shown as a conventional rotary encoder including a swing arm 82 equipped with a breakaway probe or wand 84 that projects transversely outward from the swing arm 82. The probe 84 is manually moveable between a first position where the probe is biased against the top surface of the top member 72, and a second position (not shown) in which the probe 84 projects transversely outward from the cold planer 20. When the probe 84 is in the first position, the swing arm 82 rotates as the vertical member 66 moves upward and downward relative to the linear bearing structure 68. The elevation measuring device 44 converts the relative linear movement between the vertical member 66 and the linear bearing structure 68 to a rotary code that is used by an on-board computer to measure relative vertical movement between the wheel 40 and the cold planer 20. The computer typically uses such information to determine an elevation difference between the ground surface engaged by the wheel 40 and the cutting plane of the cold planer 20. When the probe 84 is in the second position, the probe 84 is adapted to engage an external elevation setting structure such as a string line that has been set to a desired elevation.

Although a rotary encoder is preferred, it will be appreciated that other devices for measuring variations in elevation, such as linear distance sensors, could also be used.

As previously described, the sensing assembly of the kickback protection device 22 includes an electronic sensor 42 for detecting when the wheel 40 moves backward a predetermined distance. Preferably, the electronic sensor 42 is a conventional proximity sensor/switch adapted for detecting ferromagnetic materials positioned directly adjacent to the sensor. Of course, any number of alternative sensors for detecting motion, including strictly mechanical or hydraulic/mechanical devices, can also be used. Exemplary proximity sensors with complementary output are distributed by Turk, Inc. and Microswitch, Inc.

The electronic sensor 42 is preferably mounted in one of first, second, third, fourth and fifth openings 86, 88, 90, 92 and 94 defined by the second plate 62 of the fork structure 58. The openings 86–94 are preferably aligned along a first arc 95. When the wheel 40 is mounted in the fork structure 58, the first arc 95 is preferably adapted to be transcribed about or concentric with the axle 54 of the wheel 40. It will be appreciated that by alternating the opening position in which the electronic sensor 42 is mounted, the sensitivity of the kickback protection device 22 can be adjusted in accordance with the operating conditions of the cold planer 20. For example, if the electronic sensor 42 is mounted in the first opening 86, the sensor 42 will detect a kickback condition when the wheel 40 rotates backward approximately one inch. By contrast, if the sensor 42 is mounted in the fifth opening 94, the sensor will not detect a kickback situation until the wheel 40 has rotated backward approximately twenty inches. Of course, it will be appreciated that the above distances are strictly exemplary and that the present invention is not limited to such specifically described dimensions.

Figure 7:
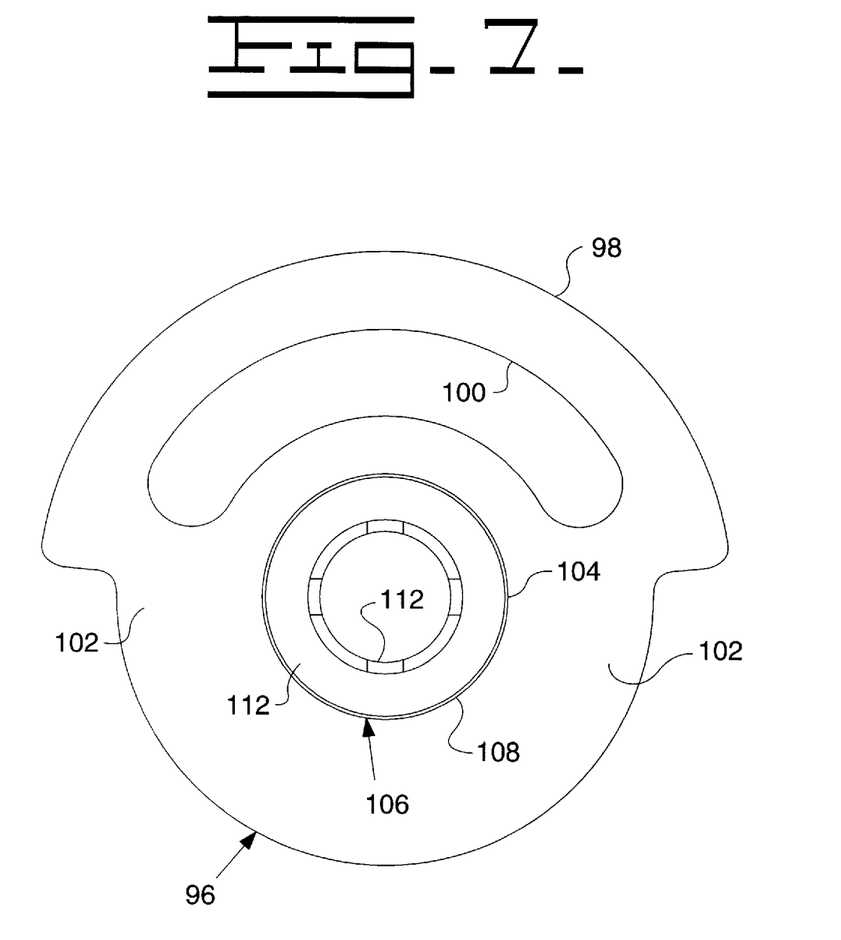
FIG. 7 is a front view of a flag member utilized by the kickback protection device of FIG. 3.
Figure 8:
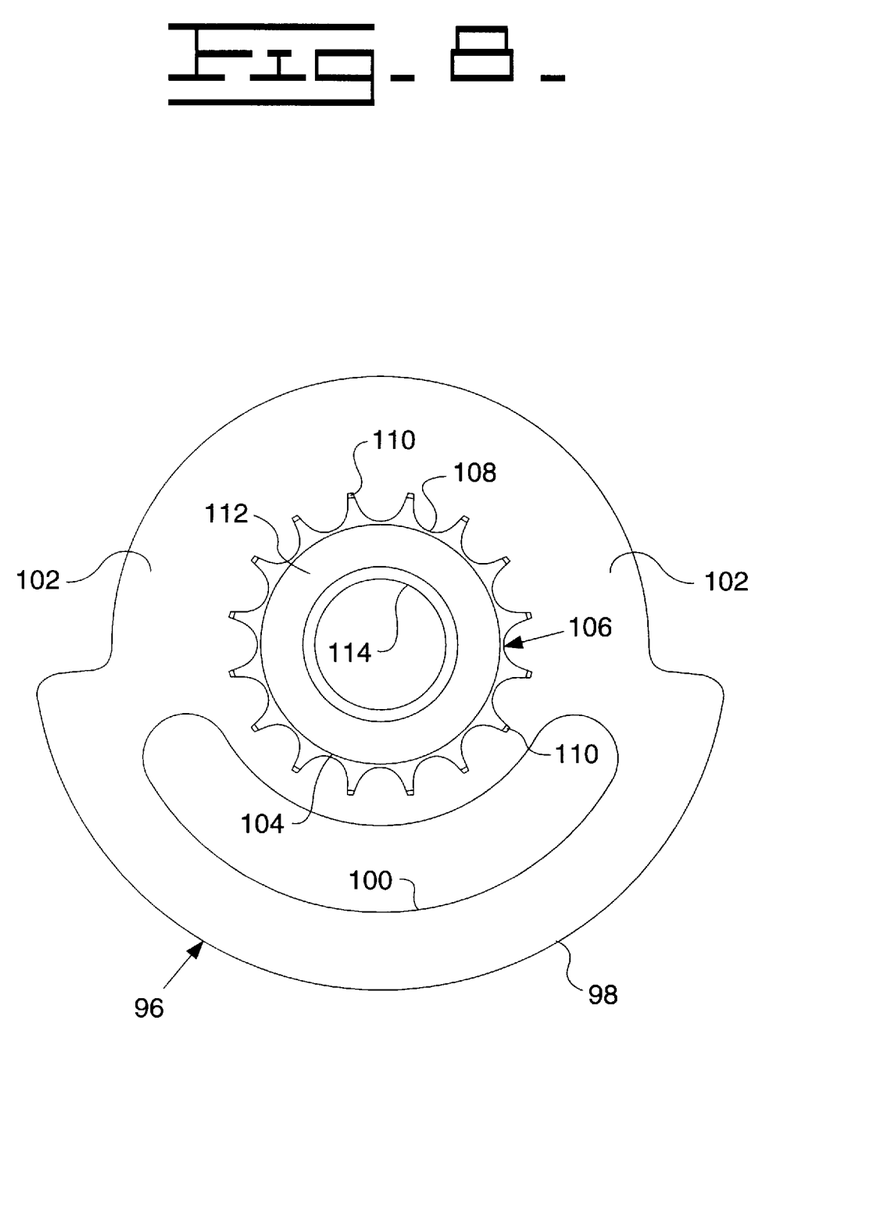
FIG. 8 is a rear view of a flag member of FIG. 7.

As shown in FIGS. 4, 7 and 8, the sensing assembly of the kickback protection device 22 also includes a flag member 96 configured to be operatively coupled to the wheel 40. The flag member 96 includes a curved projection 98 that defines an elongated curved slot 100. The flag member 96 also defines an opening 104 offset from the curved slot 100 which is configured for receiving a one-way clutch. A solid portion 102 of the flag member 96 extends around the opening 104. In one embodiment, the center of gravity of the flag member 96 is adapted to be located on the plane of symmetry of the flag member 96 between the axis of rotation of the wheel 40 and the curved slot 100.

As shown in FIGS. 4, 7 and 8, the one-way clutch mounted in the opening 104 of the flag member 96 is a standard BMX bicycle free wheel sprocket 106. An exemplary free wheel sprocket is sold by Shimano, Inc. as part number SF-MX30. Of course, alternative clutch mechanisms for controlling relative rotation between members, such as a roller clutch, can also be used.

The free wheel sprocket 106 includes an outer housing 108 having the plurality of integral sprocket teeth 110. An inner portion 112 defining a central aperture 114 including a plurality of internal threads is mounted in the housing 108. A bearing structure provides relative rotational movement between the outer housing 108 and the inner portion 112 of the free wheel sprocket 106. Additionally, an internal one-way clutch mechanism having a ratchet-type locking teeth and pall arrangement allows relative rotational movement in a first direction between the outer housing 108 and the inner portion 112, and prevents relative rotational movement in a second direction between the outer housing 108 and the inner portion 112.

The free wheel sprocket 106 is preferably mounted within the opening 104 of the flag member 96 by fixedly connecting the outer housing 108 to the body of the flag member 96. For example, as shown in FIG. 8, the outer housing 108 is fixedly connected to the flag member 96 by welding the sprocket teeth 110 of the outer housing 108 to the inner surface of the flag member 96.

Figure 9A:
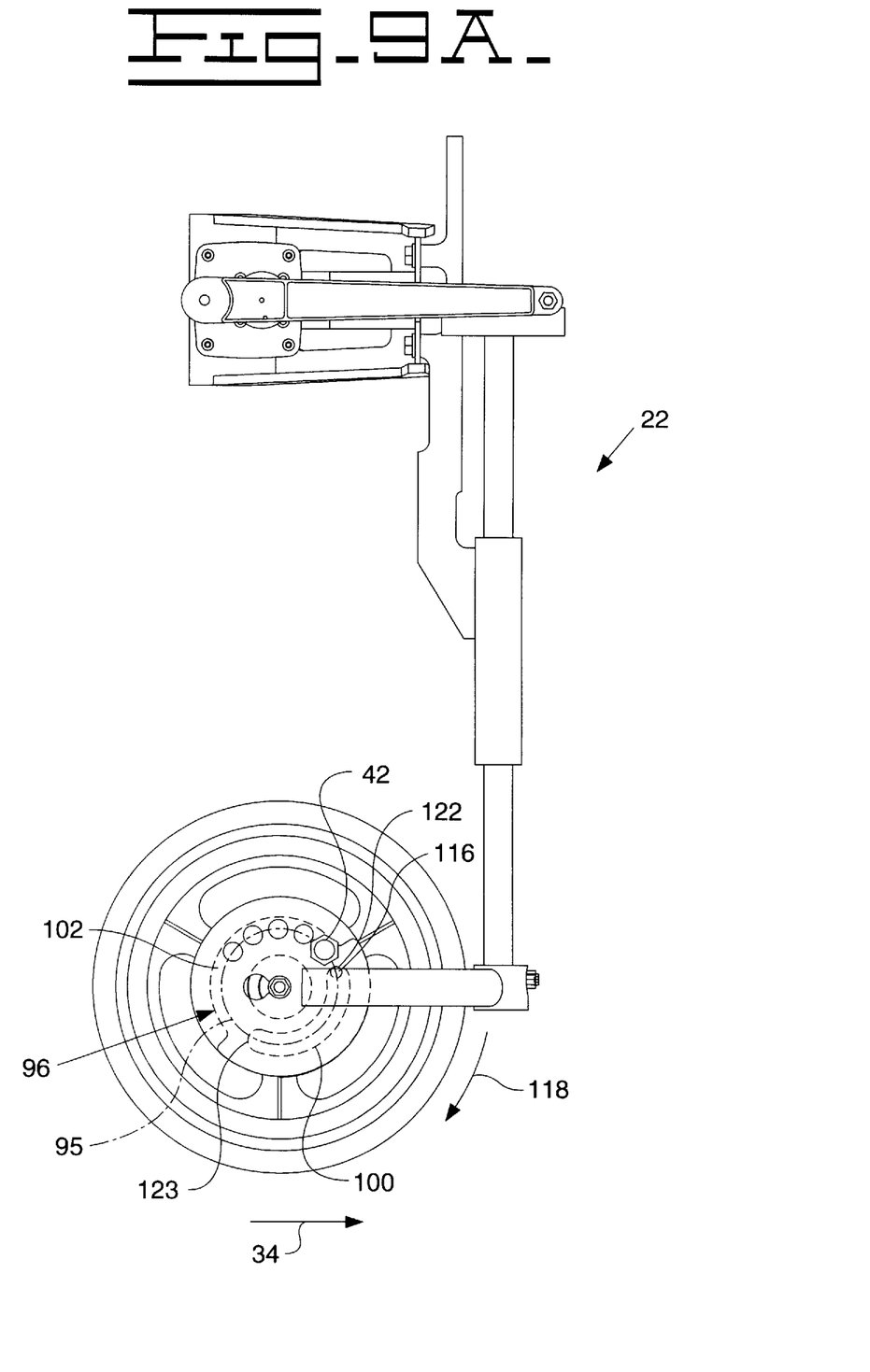
FIG. 9a is a side view of the kickback protection device of FIG. 3, the device is shown in a normal operating condition.
Figure 9B:
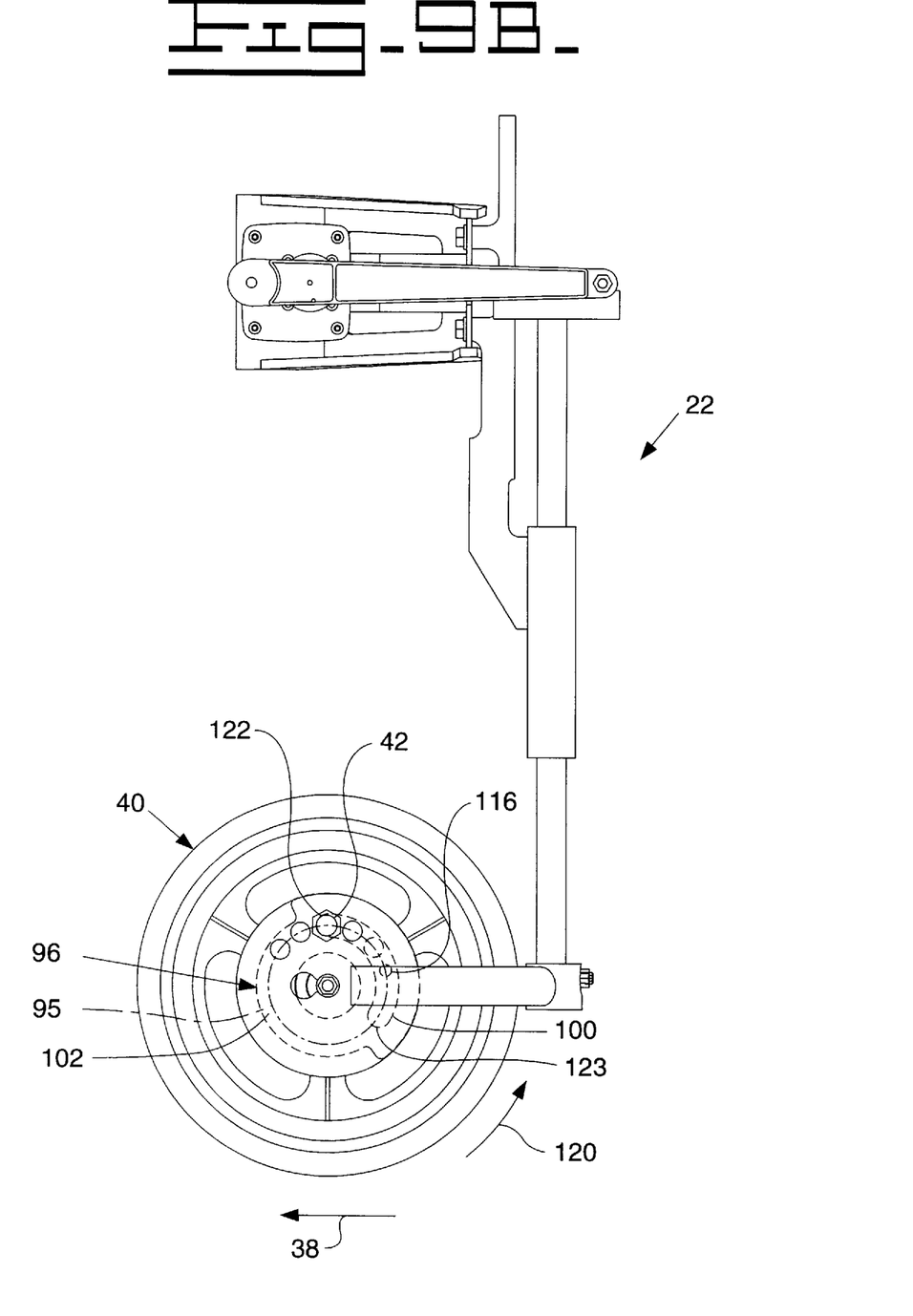
FIG. 9b is a side view of the kickback protection device of FIG. 3, the device is shown in a first disabling position.
Figure 9C:
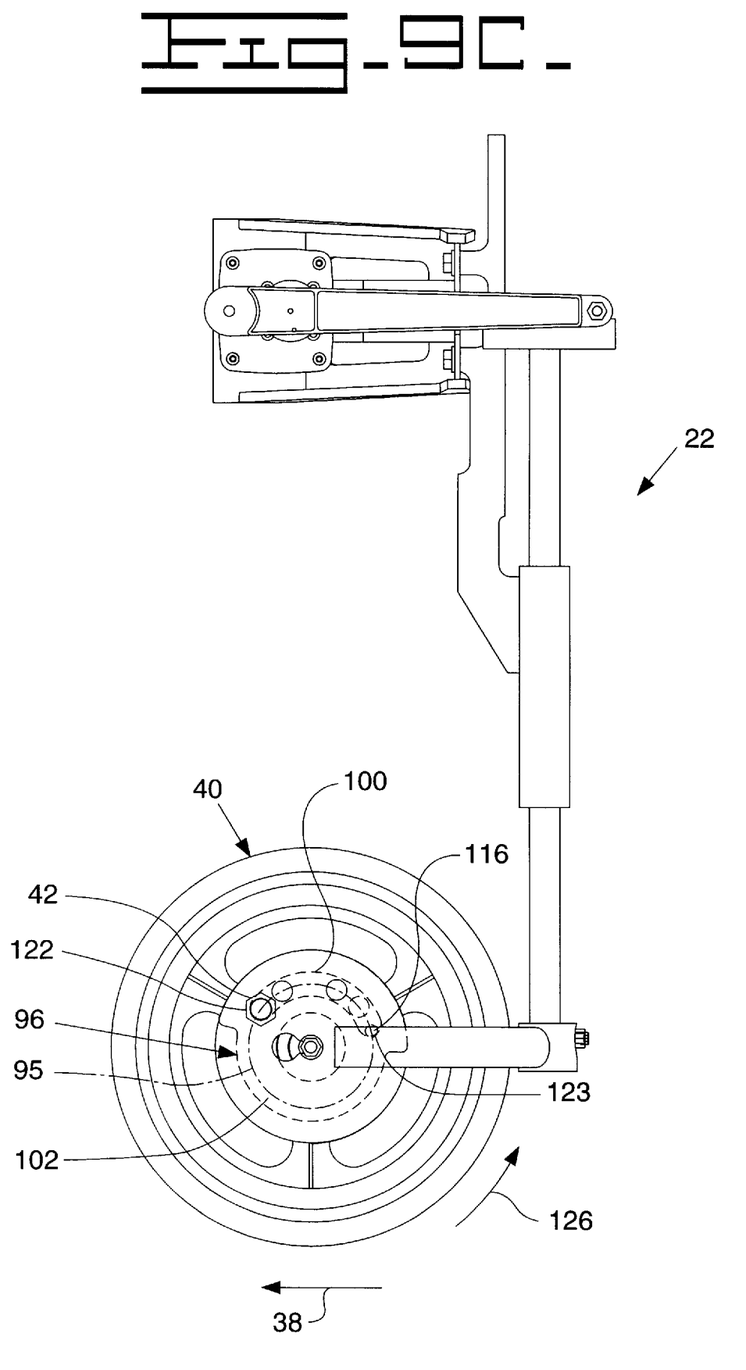
FIG. 9c is a side view of the kickback protection device of FIG. 3, the device is shown in a second disabling position.

The flag member 96 is connected to the wheel 40 by threading the inner portion 112 of the free wheel sprocket 106 on the wheel hub 50 such that the wheel hub 50 is fixedly retained within the central aperture 114 of the free wheel sprocket 106. After the flag member 96 is mounted on the wheel 40, the wheel is connected to the fork structure 58 by inserting the axle 54 in the slots 64 of the fork structure 58, and tightening the axle nuts 56. As shown in FIGS. 9a–9c, when the wheel 40 is mounted on the fork structure 58, the curved slot 100 of the flag member 96 aligns substantially along the first arc 95 defined by the openings 86–94 of the second plate 62. Additionally, limiter pin 116 connected to the second plate 62 extends through the curved slot 100 of the flag member 96. The limiter pin 116 limits the range of relative rotational motion that is possible between the flag member 96 and the second plate 62 of the fork structure 58.

As assembled, the free wheel sprocket 106 allows relative rotational movement between the wheel 40 and the flag member 96 in one direction, but prevents relative rotational movement between the wheel 40 and the flag member 96 in an opposite direction. For example, as shown in FIG. 9a, when the wheel 40 is rotated in a first direction 118, the free wheel sprocket 106 allows relative rotational movement between the wheel 40 and the flag member 96. However, as shown in FIGS. 9b and 9c, when the wheel 140 is rotated in a second direction 120, the free wheel sprocket 106 prevents relative rotation between the wheel 40 and the flag member 96 causing the flag member 96 and the wheel 40 to move together as one.

Referring now to FIGS. 1, 2 and 9a, when the cold planer 20 moves in the forward direction 34 the wheel 40 is caused to rotate in the first direction 118. As the wheel 40 moves in the first direction 118, internal friction within the clutch and bearing of the free wheel sprocket 106, combined with the force of gravity, cause the flag member 96 to move to a normal operating position in which the limiter pin 116 engages a first end 122 of the curved slot 100. With the flag member 96 retained in the normal operating position by the limiter pin 116, the wheel 40 continues to freely rotate in the first direction (indicated by arrow 118) relative to the flag member 96. It will be appreciated that while the flag member 96 is in the normal operating position of FIG. 9a, the sensor 42, which can be mounted within any one of the openings 86–94 depending upon the level of sensitivity desired, is positioned directly adjacent to the solid portion 102 of the flag member 96. Consequently, when the flag member 96 is in the normal operating position, the sensor 42 normally senses the solid portion 102 of the flag member 96.

When a kickback condition arises, the cold planer 20 moves in the backward direction 38 causing the wheel 40 to rotate in the second direction 120. The free wheel sprocket 106 prevents relative rotational movement between the flag member 96 and the wheel 40 when the wheel is rotated in the second direction 120. Consequently, when the wheel is rotated in the second direction 120, the flag member 96 also rotates in the second direction 120 causing the first end 122 of the curved slot 100 to move away from the limiter pin 116 and a second end 123 of the curved slot 100 to move toward the limiter pin 116. As the flag member 96 rotates in the second direction 120, the solid portion 102 of the flag member 96 moves away from the openings 86–94 and the curved slot 100 moves adjacent to the openings 86–94. When the first end 122 of the curved slot 100 reaches the opening in which the sensor 42 is mounted, the sensor 42 no longer senses the presence of the solid portion 102 and a kickback signal is sent to an onboard computer of the cold planer 20. The computer disables the cold planer 20 upon receipt of the kickback signal. After the cold planer 20 has been reset and resumes movement in the forward direction 34, friction within the free wheel sprocket bearing and clutch, and the center of gravity of the flag member 96, cause the flag member 96 to automatically return to the normal operating position of FIG. 9a.

It will be appreciated that the sensitivity of the kickback protection device 22 can be varied by changing the opening position in which the electronic sensor 42 is mounted. For example, if the proximity sensor 42 is mounted in the first opening 86 (as shown in FIG. 9a), the kickback alarm will be triggered when the first end 122 of the slot 100 reaches the first opening 86. Similarly, if the electronic sensor 42 is mounted in the third opening 90 (as shown in FIG. 9b), the kickback alarm will not be triggered until the first end 122 of the slot 100 reaches the third opening 90 (as also shown in FIG. 9b). Additionally, if the electronic sensor 42 is mounted in the fifth opening 94 (as shown in FIG. 9c), the kickback alarm will not be triggered until the first end 122 of the slot 100 reaches the fifth opening 94 (as also shown in FIG. 9c).

It is preferred for the electronic sensor 42 to normally sense the solid portions 102 of the flag member 96 when the flag member 96 is in the normal operating position. Such a configuration is advantageous because an alarm will be triggered if the electronic sensor becomes dislodged from one of the openings 86–94 or otherwise becomes inoperative. However, in alternative embodiments, the sensor can be configured to normally not sense metal and to trigger a kickback alarm when a portion of the flag member moves in close proximity to the sensor.

Figure 10:
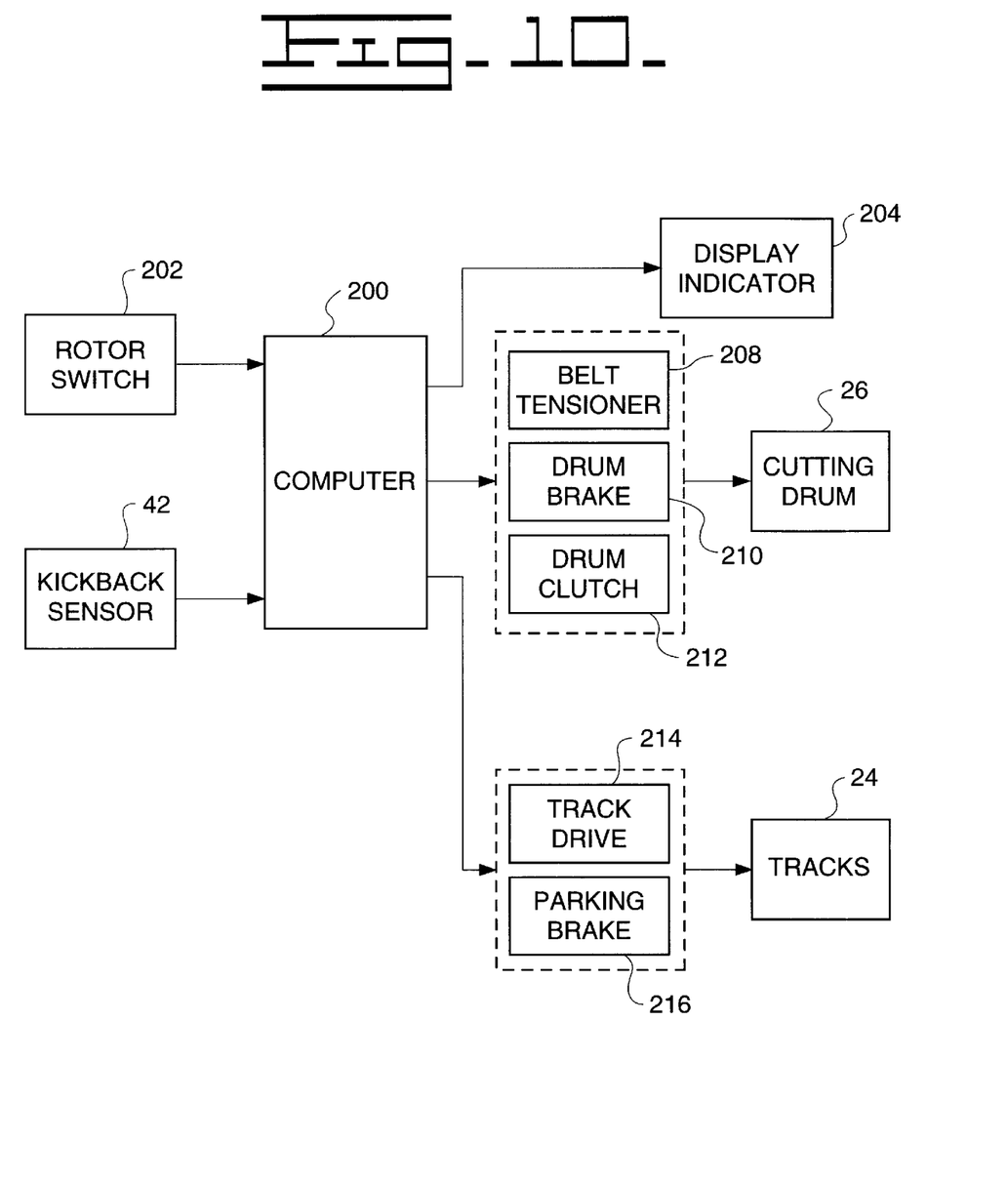
FIG. 10 is a schematic diagram illustrating a control system suitable use with the kickback protection device of FIG. 3.

FIG. 10 shows a schematic diagram illustrating an exemplary control system suitable for use with the kickback protection device 22. The system includes a central computer 200 or other type of processing unit. The computer 200 receives input from a rotor switch 202 and the electronic kickback sensor 42. The computer 200 controls a display indicator 204 that illuminates when a kickback has been detected. The computer 200 also controls a cutting drum 26 via a belt tensioner 208, a drum brake 210, and a drum clutch 212. The computer further controls a plurality of tracks 24 via a track drive 214 and a parking brake 216. The belt tension 208, drum brake 210, drum clutch 212, track drive 214, and the parking brake 216 are each hydraulically controlled and operated.

In basic operation, an operator of the cold planer 20 activates the cutting drum 26 by turning on the rotor switch 202. When the rotor switch 202 is turned on, the computer 200 activates the belt tensioner 208 which tensions a belt that drives the cutting drum 26. The computer also releases the drum brake 210 and engages the drum clutch 212. The drum clutch 212 transfers torque from the engine of the cold planer 20 through the belt to the drum 26 causing the drum 26 to rotate. Once the drum 26 begins to rotate, the parking brake 216 for the tracks 24 is released and the track drive 214 is activated such that the tracks 24 propel the cold planer 20 in the forward direction. When the kickback sensor 42 detects a kickback situation, the computer 200 illuminates the display 204 and automatically disengages the drum clutch 212, activates the drum brake 210 and releases tension on the drive belt via the tensioner 208. Additionally, the computer 200 de-activates the track drive 214 and activates the parking brake 216.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning of the following claims.

What is claimed is:

1. A device for detecting when a cold planer equipped with a computer experiences a kick-back condition, the device comprising:

a wheel;

a mounting assembly for connecting the wheel to the cold planer such that the wheel is adapted to rotate in a first direction when the cold planer travels forward, and a second direction when the cold planer travels backwards; and a sensing assembly including an electronic sensor, the sensing assembly being arranged and configured for detecting when the wheel travels in the second direction, and for providing a kick-back indicator signal to the computer of the cold planer indicating that a kick-back has been detected.

2. The device of claim 1, wherein the mounting assembly is constructed and arranged to allow the wheel to caster.

3. The device of claim 1, wherein the mounting assembly includes structure for measuring relative vertical movement between the wheel and the cold planer.

4. The device of claim 1, wherein the mounting assembly is connected to the cold planer, and the electronic sensor is electronically connected to the computer of the cold planer.

5. The device of claim 1, wherein the sensing assembly includes a flag member operatively connected to the wheel via a one-way clutch, the flag member being constructed and arranged to move to a normal operating position when the wheel is rotated in the first direction and a disabling position when the wheel is rotated in the second direction, and the electronic sensor being arranged and configured to sense movement of the flag member and to send the kick-back indicator signal to the computer of the cold planer when the flag member moves from the normal operating position to the disabling position.

6. The device of claim 5, wherein the electronic sensor is a proximity sensor.

7. The device of claim 5, wherein the one-way clutch allows relative movement between the wheel and the flag member when the wheel is rotated in the first direction, and prevents relative movement between the wheel and the flag when the wheel is rotated in the second direction.

8. The device of claim 5, wherein the flag member includes a solid portion and a curved slot, the curved slot being aligned along a first arc transcribed about an axis of rotation of the wheel.

9. The device of claim 8, wherein the electronic sensor comprises a proximity sensor, the solid portion of the flag member is positioned adjacent to the proximity sensor when the flag member is in the normal operating position, and the slot is positioned adjacent to the proximity sensor when the flag member is in the disabling position.

10. The device of claim 9, further comprising a sensor mounting plate positioned adjacent to the flag member, the sensor mounting plate including a plurality of openings aligned along the first arc, the openings being configured for individually receiving the proximity sensor.

11. The device of claim 1, wherein the sensing assembly includes a first and second locations for individually mounting the electronic sensor, the first location being oriented such that the sensor sends the kick-back indicator signal when the wheel rotates a first predetermined distance in the second direction, and the second location being oriented such that the sensor sends the kick-back indicator signal when the wheel rotates a second predetermined distance in the second direction.

12. The device of claim 1, wherein the mounting assembly includes structure for allowing the wheel to move vertically relative to the cold planer, and the device further includes a measuring apparatus for measuring the vertical movement of the wheel.

13. A device of claim 12, wherein the mounting assembly includes a top plate, and the measuring apparatus comprises a rotary encoder having a swing arm equipped with a probe adapted to contact the top plate.

14. The device of claim 13, wherein the probe is moveable between a first position where the probe engages the top plate, and a second position where the probe is adapted to project outward from the cold planer.

15. A method for disabling a cold planer that experiences a kickback condition, the cold planer being equipped with a milling drum, the method comprising the steps of:

providing a wheel mounted to the cold planer, the wheel being arranged to rotate in a first direction when the cold planer moves forward and a second direction when the cold planer moves backwards;

monitoring the rotation of the wheel;

sensing when the wheel rotates a predetermined distance in the second direction; and disabling the milling drum when he wheel rotates the predetermined distance in the second direction.

16. A device for detecting when a cold planer experiences a kick-back condition, the device comprising:

a wheel;

a mounting assembly for connecting the wheel to the cold planer such that the wheel is adapted to rotate in a first direction when the cold planer travels forward, and a second direction when the cold planer travels backwards; and a sensing assembly arranged and configured to detect when the wheel travels a predetermined distance in the second direction, wherein the cold planer is deactivated when the sensing assembly detects that the wheel has traveled the predetermined distance in the second direction.

17. The device of claim 16, wherein the sensing assembly includes a flag member operatively connected to the wheel via a one-way clutch.

18. The device of claim 17, wherein the sensing assembly includes a proximity sensor for detecting movement of the flag member.

* * * * *